(12) United States Patent
Porter

(10) Patent No.: US 7,395,893 B2
(45) Date of Patent: *Jul. 8, 2008

(54) FOUR-WHEEL DRIVE HYBRID VEHICLE

(75) Inventor: Fred C. Porter, The Valley, AL (US)

(73) Assignee: Magna Powertrain USA, Inc., Troy, MI (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/517,400

(22) Filed: Sep. 7, 2006

(65) Prior Publication Data

US 2007/0000707 A1    Jan. 4, 2007

Related U.S. Application Data

(63) Continuation of application No. 11/285,623, filed on Nov. 22, 2005, now Pat. No. 7,125,357, which is a continuation of application No. 10/667,168, filed on Sep. 19, 2003, now Pat. No. 7,004,869, which is a continuation of application No. 10/007,402, filed on Dec. 5, 2001, now Pat. No. 6,648,785.

(60) Provisional application No. 60/286,120, filed on Apr. 24, 2001.

(51) Int. Cl.
  *B60K 17/34*    (2006.01)
  *F16H 3/72*    (2006.01)

(52) U.S. Cl. .................... 180/243; 180/65.2; 475/5

(58) Field of Classification Search ............... 180/243, 180/65.2, 65.3; 475/5
See application file for complete search history.

(56) References Cited

U.S. PATENT DOCUMENTS

| 5,017,183 A | 5/1991 | Teraoka |
| 5,620,387 A | 4/1997 | Janiszewski |
| 5,839,535 A | 11/1998 | Arai |
| 5,954,612 A | 9/1999 | Baxter |
| 6,041,877 A | 3/2000 | Yamada et al. |

(Continued)

FOREIGN PATENT DOCUMENTS

GB    2088975    6/1982

(Continued)

*Primary Examiner*—Tony H. Winner
(74) *Attorney, Agent, or Firm*—Harness, Dickey & Pierce, P.L.C.

(57) ABSTRACT

A hybrid drive system for a four-wheel drive system arranged to supply motive power to a primary output shaft of a transfer case from an internal combustion engine and to a secondary output shaft from an electric motor/generator. The transfer case is comprised of a planetary gearset having an input driven by the motor/generator and an output directing drive torque to the secondary drivelines. This hybrid drive arrangement permits use of a modified transfer case in place of a conventional transfer case in a traditional four-wheel drive driveline.

22 Claims, 4 Drawing Sheets

U.S. PATENT DOCUMENTS

| | | | |
|---|---|---|---|
| 6,048,289 A | 4/2000 | Hattori et al. | |
| 6,059,064 A * | 5/2000 | Nagano et al. | 180/243 |
| 6,083,138 A | 7/2000 | Aoyama et al. | |
| 6,083,139 A | 7/2000 | Deguchi et al. | |
| 6,098,733 A | 8/2000 | Ibaraki et al. | |
| 6,099,430 A | 8/2000 | Winks | |
| 6,110,066 A | 8/2000 | Nedungadi et al. | |
| 6,116,363 A | 9/2000 | Frank | |
| 6,146,302 A | 11/2000 | Kashiwase | |
| 6,321,865 B1 * | 11/2001 | Kuribayashi et al. | 180/243 |
| 6,371,878 B1 | 4/2002 | Bowen | |
| 6,435,296 B1 * | 8/2002 | Arai | 180/243 |
| 6,464,608 B2 | 10/2002 | Bowen et al. | |
| 6,490,945 B2 | 12/2002 | Bowen | |
| 6,499,549 B2 | 12/2002 | Mizon et al. | |
| 6,540,035 B2 * | 4/2003 | Nagano et al. | 180/65.2 |
| 6,549,840 B1 * | 4/2003 | Mikami et al. | 701/69 |
| 6,589,128 B2 | 7/2003 | Bowen | |
| 7,044,255 B2 * | 5/2006 | Maeda et al. | 180/242 |

FOREIGN PATENT DOCUMENTS

| | | |
|---|---|---|
| JP | 401095944 | 4/1989 |
| JP | 4-302744 | 10/1992 |
| JP | 405131858 | 5/1993 |

* cited by examiner

FOUR-WHEEL DRIVE HYBRID VEHICLE

CROSS-REFERENCE TO RELATED APPLICATIONS

This application is a continuation of U.S. patent application Ser. No. 11/285,623 filed Nov. 22, 2005, now U.S. Pat. No. 7,125,357, which is a continuation of U.S. patent application Ser. No. 10/667,168 filed Sep. 19, 2003, now U.S. Pat. No. 7,004,869, issued Feb. 28, 2006, which is a continuation of U.S. patent application Ser. No. 10/007,402 filed Dec. 5, 2001, now U.S. Pat. No. 6,648,785, issued Nov. 18, 2003, which claims the benefit of U.S. Provisional Application No. 60/286,120, filed Apr. 24, 2001.

FIELD OF THE INVENTION

The present invention relates generally to hybrid drive systems for motor vehicles and, more specifically, to a transfer case for use in four-wheel drive hybrid vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid vehicles have also been adapted to four-wheel drive vehicles and typically utilize the above-noted parallel hybrid powertrain to drive the primary wheels and a second electric motor to drive the secondary wheels. Obviously, such a four-wheel drive system is extremely expensive and difficult to package. Thus, a need exists to develop hybrid powertrains for use in four-wheel drive vehicles that utilize many conventional powertrain components so as to minimize specialized packaging and reduce cost.

SUMMARY OF THE INVENTION

It is therefore an object of the present invention to provide a hybrid powertrain or drive system for a four-wheel drive vehicle.

In accordance with another object, the four-wheel drive hybrid drive system of the present invention includes a transfer case adapted for connection between the transmission and the front and rear drivelines of the motor vehicle.

According to another object, the four-wheel drive hybrid drive system is a parallel-type system with a gearbox and an electric motor/generator integrated into the transfer case.

As a related object, the hybrid drive system of the present invention permits use of the internal combustion engine and the electric motor/generator separately or in combination as power sources for driving the motor vehicle.

These and other objects are provided by a transfer case adapted for use in a hybrid vehicle drive system having a primary power source, a primary driveline and a secondary driveline. The transfer case includes a primary output shaft connecting the primary power source to the primary driveline, a secondary output shaft connected to the secondary driveline, a gearbox having an input member and an output member connected to the secondary output shaft and a secondary power source connected to the input member of the gearbox. The primary power source is a powertrain comprised of an internal combustion engine and a transmission. The secondary power source is an electric motor/generator.

Further areas of applicability of the present invention will become apparent from the detailed description provided hereinafter. It should be understood that the detailed description and specific examples, while indicating preferred embodiments of the present invention, are intended for purposes of illustration only since various changes and modifications within the scope of this particular invention will become apparent to those skilled in the art.

DETAILED DESCRIPTION OF THE PREFERRED EMBODIMENT

Figure 1:
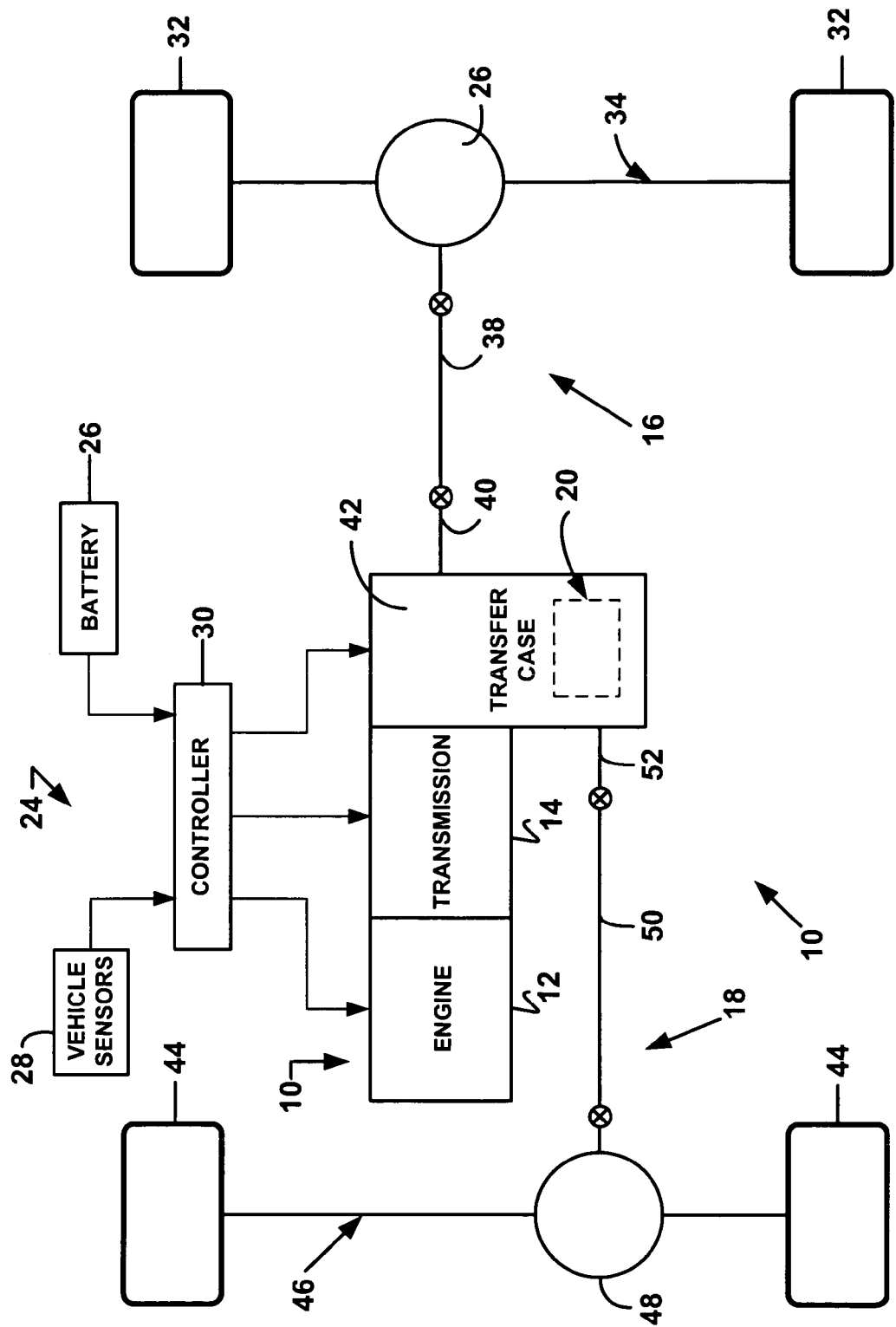
FIG. 1 shows a hybrid drive system for a four-wheel drive vehicle in accordance with the present invention.

Referring to the drawings, a four-wheel drive powertrain for a hybrid motor vehicle is shown to include a primary power source 10 comprised of an internal combustion engine 12 and a transmission 14, a primary driveline 16, a secondary driveline 18 and a secondary power source 20 comprised of an electric motor/generator 22. The vehicle further includes a powertrain control system 24 generally shown to include a battery 26, a group of vehicle sensors 28 and a controller 30. Primary driveline 16 includes a first pair of wheels 32 connected to a first axle assembly 34 having a differential unit 36 connected to one end of a primary prop shaft 38, the opposite end of which is connected to a primary output shaft 40 of a transfer case 42. Similarly, secondary driveline 18 includes a second pair of wheels 44 connected to a second axle assembly 46 having a differential unit 48 connected to one end of a secondary prop shaft 50, the opposite end of which is connected to a secondary output shaft 52 of transfer case 42.

In the embodiment shown, primary driveline 16 is the rear driveline such that motive power (i.e., drive torque) generated by engine 12 and transmission 14 is transmitted to rear wheels 32 for establishing a two-wheel/rear drive mode of operation. As will be detailed, electric motor/generator 22 is operable to drive the secondary driveline that is, the front driveline, such that motive power is transmitted to front wheels 44 for establishing either of a two-wheel/front drive mode or a four-wheel drive mode. It is to be understood that the present invention is likewise applicable to a drivetrain arrangement in which primary power source 10 transmits power to the front driveline while secondary power source 20 transmits power to the rear driveline.

Figure 2:
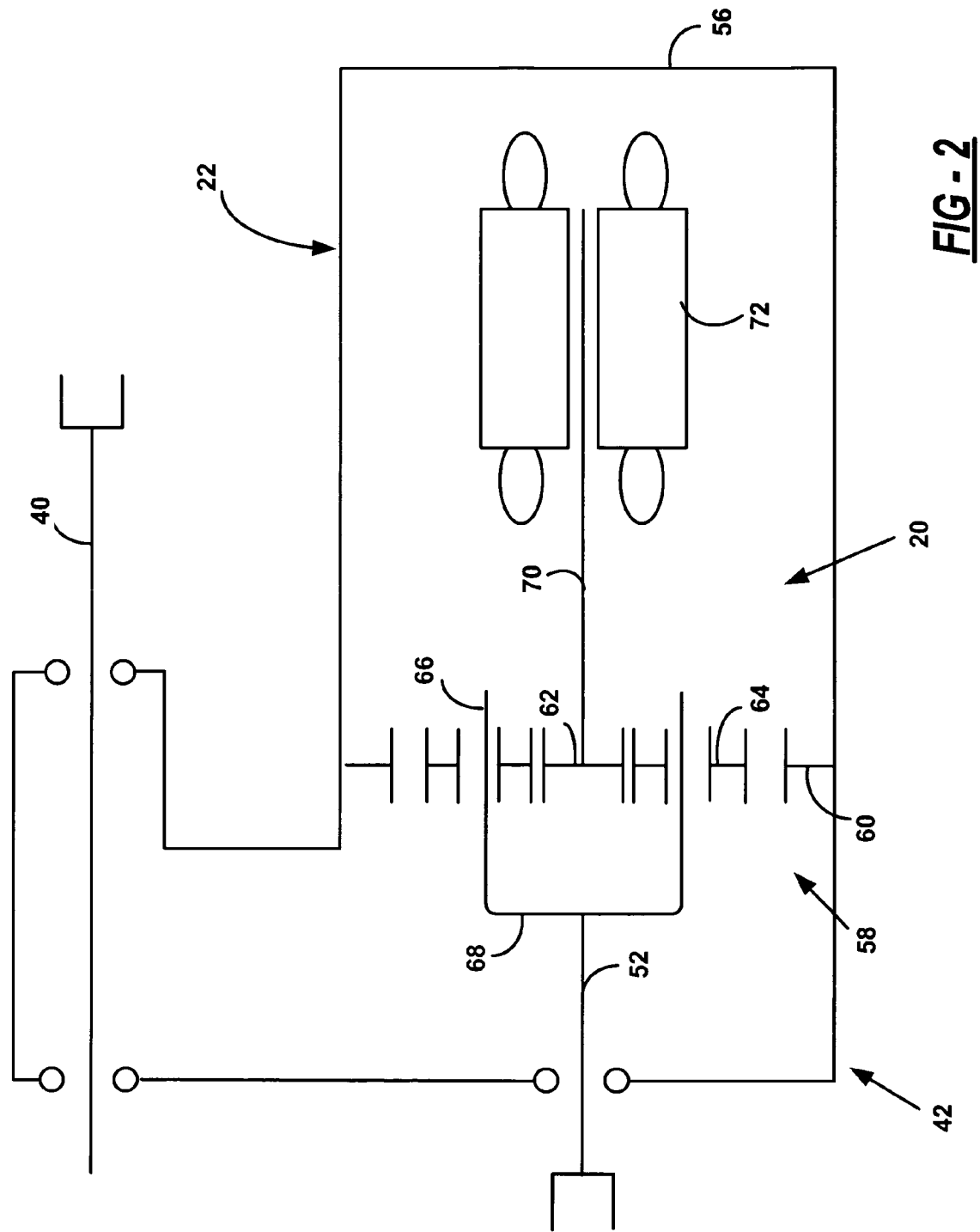
FIG. 2 is a schematic view of a transfer case associated with the hybrid powertrain of FIG. 1.

Referring now primarily to FIG. 2, transfer case 42 is shown schematically to include a housing assembly 56 of the type normally adapted for bolted mounting to the casing of transmission 14. Primary output shaft 40 is rotatably supported in housing 56 by bearing assemblies and is adapted for direct connection between the transmission output shaft and primary prop shaft 38. In this manner, drive torque from engine 12 is transferred through transmission 14 and output shaft 40 to primary driveline 16. Transfer case 42 further includes a planetary gearset 58 operably installed between secondary output shaft 52 and electric motor/generator 22. Gearset 58 includes ring gear 60 that is non-rotationally fixed (i.e., such as to the housing a transfer case 42), a sun gear 62 and planet gears 64 meshed with sun gear 63 and ring gear 60. Planet gears 64 are rotatably supported on pins 66 that are fixed to a planet carrier 68. As seen, planet carrier 68 is fixed for rotation with secondary output shaft 52 while sun gear 62 is fixed for rotation with a rotor shaft 70 of motor/generator 22. Thus, energization of a stator 72 of motor/generator 22 causes driven rotation of rotor shaft 70 and sun gear 62 which results in rotation of planet carrier 68 at a reduced speed, such that planetary gearset 58 acts as a reduction gearset. While not intended to be limiting, it is contemplated that a preferred reduction ratio of about 3 to 1 is established by rear planetary gearset 58.

Figure 3:
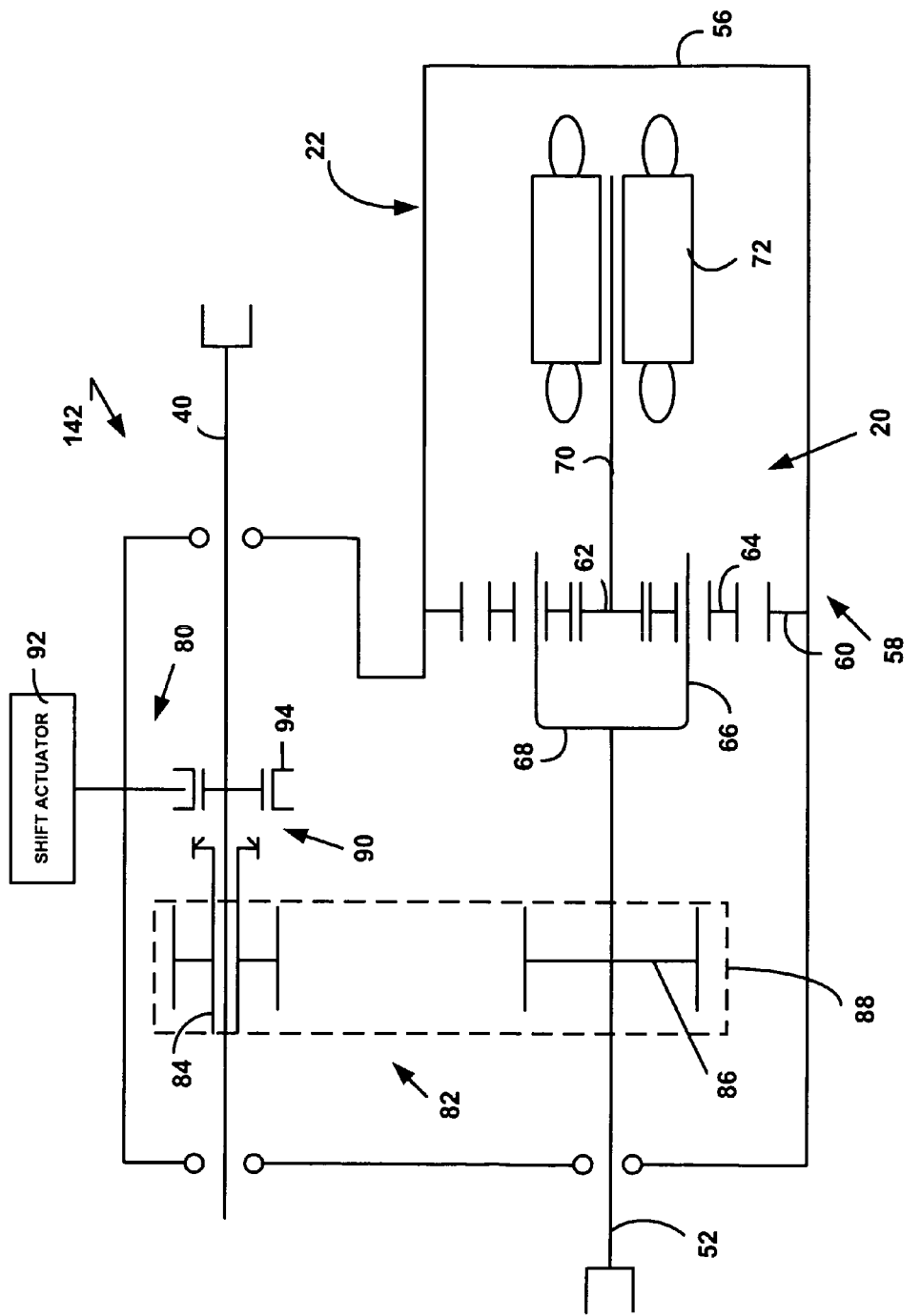
FIG. 3 is a schematic of an alternative construction for a transfer case adapted for use in the hybrid drive system of FIG. 1.

Transfer case 42 is, in essence, not a transfer unit but rather a unit for housing secondary power source 20 within the packaging conventionally provided for the transfer case in a four-wheel drive vehicle. A hybrid transfer case 142 is shown in FIG. 3 which is generally similar to transfer case 42 except that a selectively engageable clutch and shift system 80 is incorporated therein. System 80 includes a transfer assembly 82 for selectively transferring drive torque from primary output shaft 40 to secondary output shaft 52 to establish a locked four-wheel drive mode. Transfer assembly 82 includes a first sprocket 84 rotatably supported on primary output shaft 40, a second sprocket 86 fixed to secondary output shaft 52, and a power chain 88 meshed therebetween. A mode clutch 90 is provided for selectively coupling first sprocket 84 to primary output shaft 40. Mode clutch 90 is shown as a synchronized dog clutch having a power-operated shift actuator 92 operable for moving a dog sleeve 94 between a released and an engaged position. It will be understood that dog clutch can be readily replaced with a power-operated (electromagnetic, hydraulic, pneumatic, motor-driven, etc.) multi-plate friction clutch between output shaft 40 and sprocket 84 such that the torque transfer can be adaptively controlled anywhere in a range between 100:0 to 50:50 rear-to-front ratio.

The hybrid drive system of the present invention includes two drive power sources, namely internal combustion engine 12 and motor/generator 22. Power from engine 12 is transmitted to transmission 14 which, in turn, is delivered to transfer case 42 via the transmission output shaft. Transmission 14 can be of any known type (i.e., automatic, manual, automated manual, CVT) having a forward-reverse switching mechanism and a gearshift mechanism. Motor/generator 22 is connected to battery 26 and can be selectively placed in any of a DRIVE state, a CHARGING state, and a NO-LOAD state by controller 30. In the DRIVE state, motor/generator 22 functions as an electric motor which is driven by electric energy supplied from battery 26. In the CHARGING state, motor/generator 22 functions as an electric generator with regenerative braking (brake torque electrically generated by motor/generator 22) for storing electrical energy in battery 26. In the NO-LOAD state, the output (i.e., rotor 70) of motor/generator 22 is permitted to rotate freely.

Figure 4:
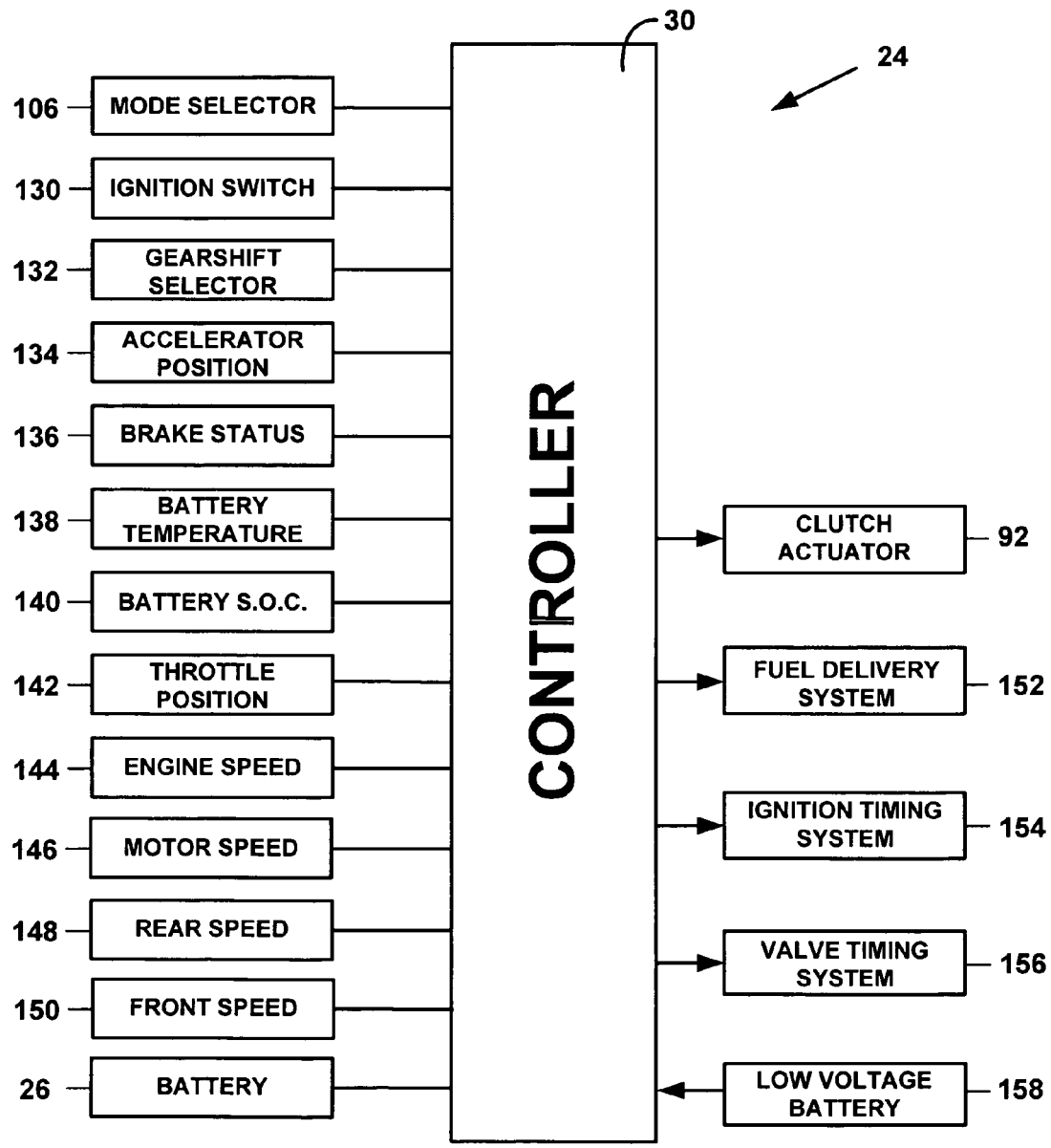
FIG. 4 is a diagram showing the control system associated with the hybrid drive systems of the present invention.

As noted, control system 24 is provided for controlling operation of the hybrid powertrain shown in FIG. 1 equipped with either of transfer cases 42 or 142. Referring to FIG. 4, controller 30 is shown to receive input signals from various sensors and input devices previously identified cumulatively in FIG. 1 as vehicle sensors 28. Controller 30 is principally comprised of a microcomputer having a central processing unit (CPU), random-access memory (RAM), read-only memory (ROM) and an input-output actuator interface. Controller 30 performs data processing operations to execute various control routines according to control programs and/or maps stored in the ROM. Controller 30 receives data from an ignition switch 130, a gearshift lever switch 132, an accelerator position sensor 134, a brake status switch 136, a battery temperature sensor 138, a battery SOC (state of charge) sensor 140, and a throttle position sensor 142. In addition, other inputs include an engine speed sensor 144, a motor speed sensor 146, a rear shaft speed sensor 148 and a front shaft speed sensor 150. Ignition switch 130 is closed when the vehicle key is turned on. Assuming transmission 14 is of an automatic type, then "P", "N", "R", and "D" switches in gearshift selector switch 132 are closed when the gearshift mechanism is located in its Park (P), Neutral (N), Reverse (R) and Drive (D) positions, respectively. Accelerator position sensor 134 senses the depression angle of an accelerator pedal. Brake status switch 136 is turned on when the brake pedal is depressed. Battery temperature sensor 138 senses the temperature of battery 26. Battery SOC sensor 140 senses the charge level of battery 26. Throttle position sensor 142 senses the degree of opening of the engine throttle valve. Engine speed sensor 144 senses a parameter indicative of the rotary speed of the drive shaft of engine 12. Motor speed sensor 146 senses a parameter indicative of the rotary speed of rotor 70 of motor/generator 22. Rear speed sensor 148 senses the rotary speed of either rear output shaft 40 or rear propshaft 38 and can further be used as an indication of vehicle speed. Front speed sensor 150 senses the rotary speed of either front output shaft 52 or front prop shaft 50.

Based upon the operating information inputted to controller 30, a mode of operation of the hybrid powertrain is selected and controller 30 sends electric control signals to the various power-operated controlled devices. Specifically, controller 30 monitors and continuously controls actuation of motor/generator 22. Additionally, controller 30 monitors and controls various engine management systems for controlling the speed and torque generated by engine 12. These include a fuel injection system 152, an ignition timing system 154, and a valve timing system 156. A low voltage auxiliary battery 158 may serve as the power supply for controller 30.

There are four modes of operation for vehicle 10, namely: (a) an electric mode; (b) a hybrid; (c) an engine mode; and (d) a regenerative mode. In the electric mode, only motor 22 provides motive power to vehicle 10. In the hybrid mode, both engine 12 and motor 22 provide motive power to vehicle 10. In the engine mode, only engine 12 provides motive power to vehicle 10. In the regenerative mode, a portion of the engine power is absorbed by motor/generator 22 to charge battery 26. The transition from one mode to the next is smooth and transparent to the vehicle operator since controller 30 selects the most appropriate mode depending on various vehicle operating conditions including vehicle speed, accelerator demand and battery charge status.

During operation in the electric mode, it is contemplated that the vehicle may be driven up to about thirty miles per hour. This permits use of the electric mode in urban areas and stop and go driving so as to reduce the overall fuel consumption of vehicle 10.

When shifting from the electric mode into the hybrid mode, engine 12 is started. Such that engine 12 and transmission 14 deliver power to primary driveline 16 while motor/generator 22 delivers power to secondary driveline 18. Controller 30 controls engine torque via real-time control of the various engine management systems in conjunction with controlling the motor torque developed by motor/generator 22. Under light throttle conditions, motor/generator 22 may be placed in its CHARGING state to recharge battery 26.

When operating conditions of vehicle 10 warrant operation in the engine only mode, the hybrid drive system is switched by simply shifting motor/generator 22 into its NO-LOAD state. Additionally, motor/generator 22 can be shifted into its CHARGING state to provide regenerative braking. A mode selector 106 is provided for permitting the vehicle operator to intentionally select operation in one of an AUTO mode and a 4WD mode. Based on the particular drive mode selected, controller 30 controls the actuated condition of mode clutch 90. As such, various two-wheel drive and four-wheel drive modes are available at all times. Thus, vehicle 10 combines the commercially-successful features of a traditional four-wheel drive drivetrain architecture (engine, transmission and transfer case) with hybrid power control to significantly advance the hybrid drive technology. Moreover, the present invention provided an arrangement for a hybrid four-wheel drive vehicle which is not highly customized, but rather permits "drop-in" assembly of a hybrid transfer case in place of a conventional transfer case. This arrangement also permits the use of a smaller internal combustion engine that is sized for cruise operation while the electric assist of the motor/generator is capable of driving the vehicle at low speeds.

Preferred embodiments of the invention have been disclosed to provide those skilled in the art an understanding of the best mode currently contemplated for the operation and construction of the four-wheel drive hybrid drive system. The invention being thus described, it will be obvious that various modifications can be made without departing from the true spirit and scope of the invention, and all such modifications as would be considered by those skilled in the art are intended to be included within the scope of the following claims.

What is claimed is:

1. A hybrid motor vehicle, comprising:
   a primary power source;
   a rear driveline including a set of rear wheels;
   a rear output shaft connecting said primary power source to said rear driveline for driving said rear wheels;
   a front driveline including a set of front wheels;
   a front output shaft connected to said front driveline;
   a secondary power source including an electric motor/generator, a gearset having an input driven by said electric motor/generator and an output driving said front output shaft for driving said front wheels, and a housing enclosing said electric motor/generator, said gearset and portions of said front and rear output shafts; and
   a control system for controlling actuation of said electric motor/generator in a drive mode and a charging mode, wherein said drive mode is established when said electric motor/generator functions as a motor for driving said front output shaft, and wherein said charging mode is established when said electric motor/generator functions as a generator.

2. The hybrid motor vehicle of claim 1 wherein said housing is fixed to a transmission housing of a transmission associated with said primary power source.

3. The hybrid motor vehicle of claim 1 wherein said control system is operable to define a hybrid operating mode when said electric motor/generator is operated in its drive mode to drive said front output shaft while said rear output shaft is driven by said primary power source.

4. The hybrid motor vehicle of claim 1 wherein said control system is operable to define an engine operating mode when said electric motor/generator is operated in its charging mode such that said front output shaft is not driven while said primary power source drives said rear output shaft.

5. The hybrid motor vehicle of claim 1 wherein said control system includes a controller and sensors for detecting operating characteristics of the vehicle, and wherein said controller is operable for controlling independent actuation of said primary power source and said electric motor/generator.

6. A hybrid motor vehicle, comprising:
   a primary power source;
   a rear driveline including a set of rear wheels;
   a rear output shaft connecting said primary power source to said rear driveline for driving said rear wheels;
   a front driveline including a set of front wheels;
   a secondary power source including an electric motor/generator operable for driving said front output shaft for driving said front wheels, a mode clutch operably disposed between said rear output shaft and said front output shaft and a clutch operator adapted to engage said mode clutch for coupling said front output shaft for rotation with said rear output shaft; and
   a control system for controlling actuation of said electric motor/generator in a drive mode and a charging mode, wherein said drive mode is established when said electric motor/generator functions as a motor for driving said front output shaft, and wherein said changing mode is established when said electric motor/generator functions as a generator.

7. The hybrid motor vehicle of claim 6 wherein said control system permits selection of a two-wheel drive mode and a part-time four-wheel drive mode, said two-wheel drive mode is established with said mode clutch in a released mode, and said part-time four-wheel drive mode is established with said mode clutch in an engaged mode.

8. A hybrid motor vehicle, comprising:
   a primary power source;
   a rear driveline including a set of rear wheels;
   a rear output shaft connecting said primary power source to said rear driveline for driving said rear wheels;
   a front driveline including a set of front wheels;
   a front output shaft connected to said front driveline;
   a secondary power source including an electric motor operable for driving said front output shaft to drive said front wheels;
   a housing enclosing said electric motor and portions of said front and rear output shafts; and
   a control system for controlling actuation of said electric motor in a drive mode and a charging mode, wherein said drive mode is established when electric power is supplied to said electric motor and said charging mode is established when electric power is generated by said electric motor.

9. The hybrid motor vehicle of claim 8 wherein said control system is operable to define a hybrid operating mode when said electric motor is operated in its drive mode to drive said front output shaft while said rear output shaft is driven by said primary power source.

10. The hybrid motor vehicle of claim 8 wherein said control system is operable to define an engine operating mode when said electric motor is operated in its charging mode such that said front output shaft is not driven while said primary power source drives said rear output shaft.

11. A hybrid motor vehicle, comprising:
a powertrain having a rotary powertrain output;
a first driveline including a first differential connecting a pair of first wheels;
a second driveline including a second differential connecting a pair of second wheels;
a transfer case including a first output shaft connecting said rotary powertrain output to said first differential, a second output shaft connected to said second differential and an electric motor having a rotary motor output driving said second output shaft; and
a control system for controlling actuation of said electric motor for transferring power to said second output shaft, and wherein an electric operating mode is established when said electric motor is actuated for driving said second output shaft while no power is transferred by said electric motor to said first output shaft.

12. The hybrid motor vehicle of claim 11 wherein a hybrid operating mode is established when said powertrain is actuated for driving said first output shaft and said electric motor is actuated for driving said second output shaft.

13. The hybrid vehicle of claim 11 wherein said transfer case further includes a mode clutch for selectively coupling said second output shaft to said first output shaft.

14. The hybrid vehicle of claim 11 wherein said transfer case further includes a gearset having an input driven by said motor output and an output driving said second output shaft.

15. A hybrid motor vehicle, comprising:
a primary power source;
a first shaft connecting said primary power source to a pair of first wheels;
a second shaft connected to a pair of second wheels;
an electric motor connected to said second shaft;
a housing enclosing said electric motor and portions of said first and second shafts; and
a control system for controlling actuation of said electric motor in a drive mode and a charging mode, wherein said drive mode is established when electric power is supplied to said electric motor and said charging mode is established when electric power is generated by said electric motor.

16. The hybrid motor vehicle of claim 15 wherein said control system is operable to define a hybrid operating mode when said electric motor is operated in its drive mode to drive said second shaft while said first shaft is driven by said primary power source.

17. The hybrid motor vehicle of claim 15 wherein said control system is operable to define an engine operating mode when said electric motor is operated in its charging mode such that said second shaft is not driven while said primary power source drives said first shaft.

18. A hybrid motor vehicle, comprising:
a powertrain;
front and rear drivelines;
a transfer case having a rear output shaft for transmitting drive torque from said powertrain to said rear driveline, a front output shaft connected to said front driveline, an electric motor for selectively driving said front output shaft for transmitting drive torque to said front driveline, and a mode clutch for selectively coupling said rear output shaft to said front output shaft; and
a control system for controlling actuation of said mode clutch and said electric motor, said control system establishing a two-wheel electric drive mode and a two-wheel engine drive mode, said two-wheel electric drive mode is established when said mode clutch is released and said electric motor is actuated to drive said front output shaft while no drive torque is transmitted from the powertrain to said rear output shaft, and wherein said two-wheel engine drive mode is established when said mode clutch is released and said electric motor is off and the powertrain transmits drive torque to said rear output shaft.

19. The hybrid motor vehicle of claim 18 wherein a four-wheel engine drive mode is established when said mode clutch is engaged and said electric motor is off such that the powertrain transmits drive torque to said front and rear output shafts.

20. The hybrid motor vehicle of claim 18 wherein a four-wheel drive hybrid operating mode is established when the powertrain is actuated for driving said rear output shaft and said electric motor is actuated for driving said front output shaft while said mode clutch is released.

21. A hybrid motor vehicle, comprising:
an engine;
first and second drivelines;
a transfer case having a first output shaft for transmitting drive torque from said engine to said first driveline, a second output shaft connected to said second driveline, and an electric motor that can be selectively actuated for transmitting drive torque only to said second output shaft; and
a control system operable to establish an engine drive mode and an electric drive mode, said engine drive mode is established when said engine drives said first output shaft and said electric motor is off and said electric drive mode is established when said engine is off and said electric motor drives said second output shaft.

22. The hybrid motor vehicle of claim 21 wherein said control system is operable to establish a hybrid drive mode when said engine drives said first output shaft and said electric motor drives said second output shaft.

* * * * *